Jan. 2, 1940.  C. A. LANOUE  2,185,203
HEADLIGHT
Filed May 8, 1937  2 Sheets-Sheet 1
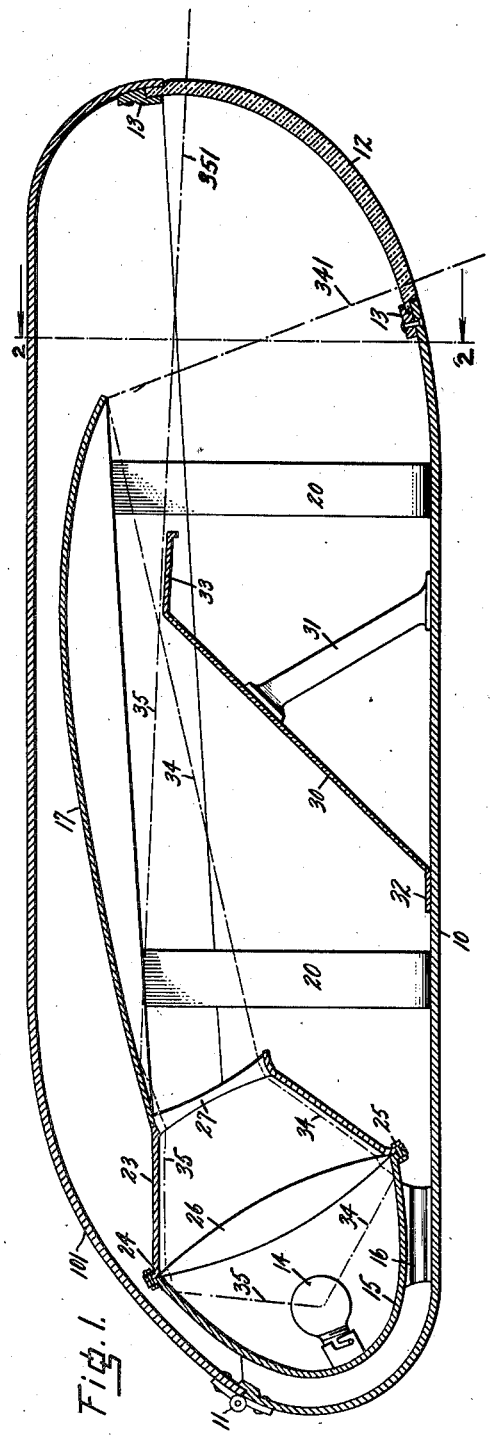
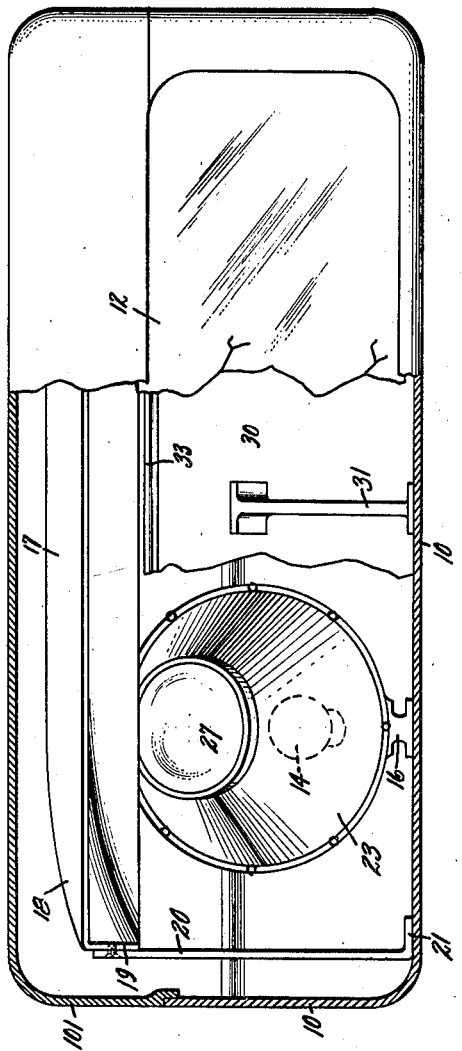
INVENTOR:
CHESTER A. LANOUE,
By [signature]
HIS ATTORNEY.

Jan. 2, 1940.   C. A. LANOUE   2,185,203
HEADLIGHT
Filed May 8, 1937   2 Sheets-Sheet 2

INVENTOR:
CHESTER A. LANOUE,
By Dann L. Wood
HIS ATTORNEY.

Patented Jan. 2, 1940

2,185,203

UNITED STATES PATENT OFFICE 2,185,203

HEADLIGHT

Chester A. Lanoue, Albany, N. Y.

Application May 8, 1937, Serial No. 141,492

4 Claims. (Cl. 240—41.1)

My invention more particularly relates to a headlight of the non-glare type in which substantially all of the light is directed from the light source forwardly from the headlight. At the same time means are provided for concealing the light source and the reflector associated therewith from the normal vision of an observer located in front of the headlight. An observer in front of a headlight is normally in a standing position or seated in an automobile and the eye of such an observer is normally located above the headlight of an automobile. When I refer to the normal vision of such an observer, therefore, I mean that his eyes are located above the headlight.

A specific object of my invention is the provision of a reflector located in the headlight in such a way that the source of light and the associated reflector or reflectors which direct the rays of light therefrom forwardly from the headlight are concealed from the normal vision of an observer located in front of the headlight. The means by which the light source and associated reflector or reflectors are concealed preferably comprises a barrier which may be partially or wholly opaque and which is located in front of the light source and the associated reflector.

Other objects of my invention will appear in the specification and the novel featurs thereof will be pointed out in the claims.

My invention will best be understood by reference to the accompanying drawings in which I have illustrated certain preferred embodiments thereof and in which Fig. 1 is a vertical longitudinal section through a headlight embodying my invention and showing certain parts in elevation;

Fig. 2 is a front elevation of the headlight partially broken away and in section on the line 2—2 of Fig. 1;

Like reference characters indicate like parts throughout the drawings.

Figure 3:
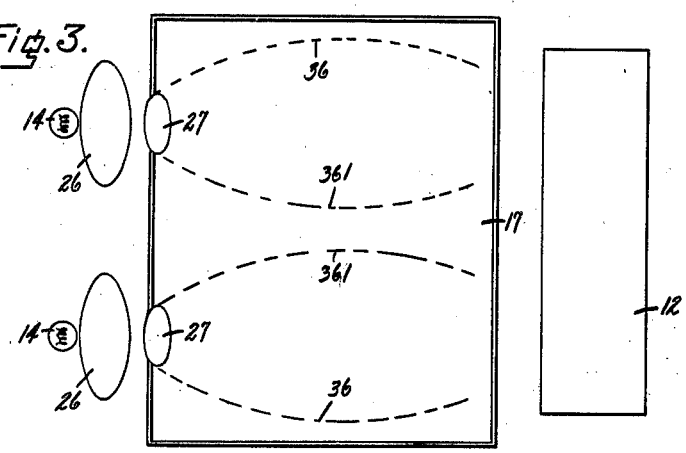
Fig. 3 is a bottom plan view of certain parts of the headlight.

Referring to the drawings, 10 is a horizontally extending casing for the headlight. While a casing is not absolutely essential for carrying out my invention, it will be understood that such casing is normally provided. The casing is preferably elongated in form and when mounted on an automobile, the longer axis of the headlight will, of course, extend longitudinally.

In the embodiment of my invention illustrated, the casing is provided with a cover 101 which is hinged at 11 in order to afford ready access to the interior of the casing. The casing is preferably provided at its front end with a window 12 which is preferably covered by a plate of curved glass, the upper and lower edges of the glass preferably being secured in position by clips 13 as illustrated in Fig. 1.

The light source 14, here illustrated as an incandescent lamp, is mounted in any kown or usual manner substantially at the focal point of a first parabolic reflcetor 15, the axis of which is inclined forwardly and upwardly as indicated in Fig. 1. The reflector 15 may conveniently be mounted on a standard 16 secured to the lower rear portion of the casing.

A second horizontally extending reflector 17 is mounted in the upper portion of the casing, at least as high as and preferably above the horizontal line passing through the upper edge of the window. The reflector 17 is curvilinear in longitudinal cross section, the radius of curvature increasing from the front to the rear thereof.

The side edges of said reflector 17 are bent downwardly and outwardly as at 18 as shown in Fig. 2 and are preferably provided at their extreme edges with downwardly extending flanges 19 which may conveniently be secured to standards 20, the bottom ends of which are provided with flanges 21 which may be secured to the bottom portion of the casing, the standards thus forming a support for the second reflector.

At the front of the reflector 15 is preferably provided a casing or housing 23 in the form of a frustrum of a cone the larger end of which is substantially the same size as the forward edge of the parabolical reflector 15 to which the casing may conveniently be secured by complementary flanges 24 with which the forward edge of the parabolic reflector and the rear edge of the casing 23 are provided and which may conveniently be secured together by screws or bolts 25. The forward edge of the housing 23 meets the rear edge of the reflector 17 as indicated in Fig. 1.

Figure 6:
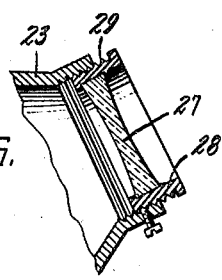
Fig. 6 is a sectional view illustrating the means for adjusting one of the lenses of the headlight.

In accordance with my invention, means are provided for directing the rays of light from the light source forwardly and upwardly against the second reflector 17 and over which the light rays from said first reflector are distributed. The rays of light from the light source are, of course, reflected forwardly by the parabolic reflector 15 in parallel lines and a lens 26, here shown as double convex in form, is mounted at the front end of the parabolic reflector which causes the light rays which pass therethrough to converge and impinge against a second lens 27, here shown as a double concave lens, which causes the light rays passing therethrough to diverge and impinge against the second reflector 17. The second lens 27 is preferably mounted in a collar 28 as best indicated in Fig. 6, which collar is provided with screw threads 29 which are received in threads on the forward cylindrically formed end of the casing or housing 23. The parts are thus constructed and arranged to direct the light rays reflected from the second reflector in a zone the upper portion of which is limited by a horizontal plane passing through the rearmost portion of said second reflector and the height of the light barrier which is disposed between the opening or window at the front of the casing on one side and the light source and the first reflector on the other is limited by the ray reflected from the rearmost portion of said second reflector which passes through said opening. Furthermore, the ray reflected from the rearmost portion of said second reflector passes through the upper portion of said opening and the ray reflected from the front of said second reflector passes downwardly through the lowermost portion of said opening. By moving the collar 28 along the axis of the lens, the lens may be nicely adjusted to cause the light rays passing therethrough to impinge properly against the second reflector 17.

In accordance with my invention a barrier or light shield 30 is interposed between the window at the front and the light source and associated parabolic reflector at the rear of the casing in order to conceal said light source and the associated reflector from the normal view of an observer located in front of the headlight. The barrier is held in position by a truss 31 the bottom of the barrier preferably being provided with a flange 32. The upper edge of the barrier is preferably provided with a forwardly extending flange 33, the barrier and flange 33 extending to a point short of the reflector 17 to leave a space through which the reflected rays of light may pass.

The described headlight operates as follows: Assuming that an extreme incident ray of light 34 from the light source 14 impinges against the forward edge of the parabolic reflector 15, it is reflected forwardly in a line parallel to the axis of the reflector and then passes through the edge of the first lens 26, then passes along the casting 23, through the edge of the second lens 27 and is bent downwardly as viewed in Fig. 1 and impinges against the forward edge of the second reflector 17 and is reflected downwardly at 341 through the lower rear edge of the window 12.

Similarly, an extreme ray of light 35 which impringes against the opposite forward edge of the reflector 15 impinges against the rear edge of the reflector 17 and the reflected ray, which is substantially horizontal, clears the upper edge of the barrier 30 and passes forwardly through the upper edge of the window 12 as indicated at 351.

Intermediate rays of light will, of course, be similarly caused first to converge as they pass through the first lens 26 and then to diverge as they pass through the second lens 27 and will impinge against intermediate portions of the second reflector 17 and will pass downwardly and forwardly through intermediate portions of the window 12. The approximate areas of the reflector 17 which are impinged by the rays of light are indicated at 36 and 361 in Fig. 3.

Referring to Fig. 3, reflector 17 is shown of sufficient size to serve two light sources in which case extreme rays engaging the areas bounded by curves 36 and 361 would cross each other and be directed to the roadway at the sides of the vehicle. The rays bounded by the curves would be directed straight ahead by the increased curvature at the edges. In case a single light source is desired, the curvature of the reflector would be modified accordingly.

Figure 4:
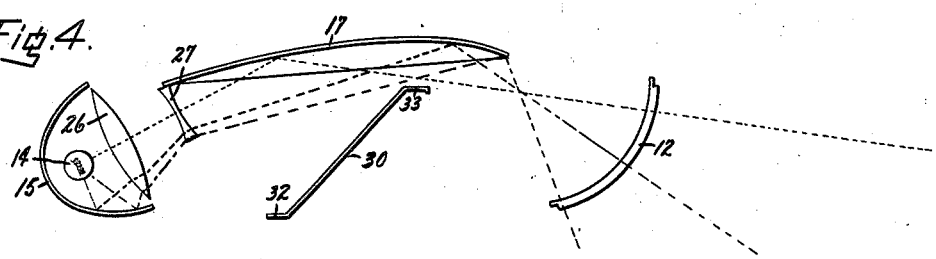
Fig. 4 is a diagrammatic view illustrating the elements of the headlight embodying my invention without a casing.
Figure 5:
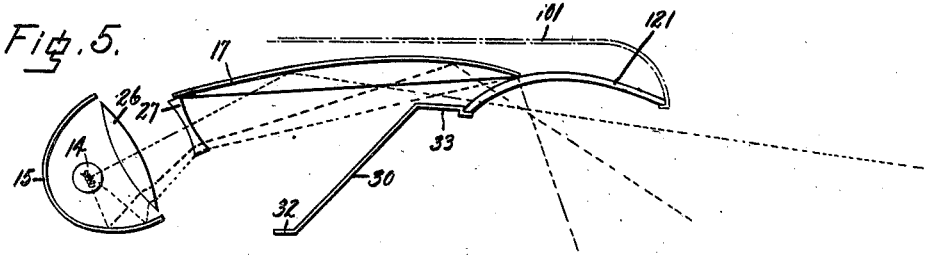
Fig. 5 is a diagrammatic view similar to Fig. 4 illustrating a modification.

In the embodiment of my invention illustrated in Fig. 5 the elements are fundamentally the same as illustrated in Figs. 1 and 4, but in the form of my invention here shown the window 121 through which the rays of light pass extends from the forward edge of the flange 33 at the upper end of the barrier to the front lower edge of the cover 101 of the casing, and is preferably curved upwardly so that the rays of light pass therethrough as nearly normal to the surface of the window as possible.

The second reflector 17 is located above the horizontal plane passing through the front lower edge of the cover of the casing so that it is concealed from the normal vision of an observer positioned in front of the headlight. Both reflectors therefore, as well as the light source are normally concealed from the normal vision of an observer located in front of the headlight.

It will be understood that while I have shown the reflector 17 distinct from the casing, it could itself serve as casing. In other words, the said reflector could be extended forwardly and at least a portion of the casing entirely dispensed with.

While I have described my invention in its preferred embodiments, it is to be understood that the words which I have used are words of description rather than of limitation and that changes within the purview of the appended claims may be made without departing from the true scope and spirit of my invention in its broader aspects.

What I claim is:

1. In a light projector of the character described, an elongated casing having a window at the front end, a light source and light directing means at the rear end of the casing for directing a beam of light rays in a generally upward direction, said light rays being substantially parallel or slightly diverging, an elongated concave reflector in the upper part of the casing with its rear edge positioned to intercept the uppermost rays and extending forwardly to intercept substantially all rays of the beam, a light barrier extending upwardly from the bottom of the casing in spaced relation to said reflector, the rear edge of said reflector and the upper margin of the window opening being in a plane passing slightly above said barrier, whereby the light source and light directing means are screened from a point of observation above said plane, the curvature of said reflector being such that light rays impinging thereon nearest the source are reflected substantially horizontally through the upper marginal portion of the window and other rays impinging along the reflector toward its forward end are reflected at progressively decreasing angles through the lower part of the window.

2. A light projector as in claim 1, characterized by the window having its surface substantially normal in vertical section to the reflected rays of the light beam.

3. A light projector as in claim 1, with the light barrier provided at its upper end with a horizontal flange angularly disposed to the barrier.

4. A light projector as in claim 1, with the light barrier provided at its upper end with a horizontal flange angularly disposed to the barrier, and having the window extending between the flange on the light barrier and the upper part of the casing; said window being so positioned as to be invisible to an observer standing in front of the light projector.

CHESTER A. LANOUE.